United States Patent [19]

Iwabuchi et al.

[11] Patent Number: 5,396,223
[45] Date of Patent: Mar. 7, 1995

[54] EARTHQUAKE DETECTING APPARATUS

[75] Inventors: Hiroo Iwabuchi, Mizusawa; Ryoichi Koga, Nara; Takashi Uno, Nara; Oohashi Tokuyoshi, Nara, all of Japan

[73] Assignee: Matsushita Electric Industrial Co., Ltd., Kadoma, Japan

[21] Appl. No.: 762,030

[22] PCT Filed: Dec. 26, 1990

[86] PCT No.: PCT/JP90/01702
§ 371 Date: Nov. 6, 1991
§ 102(e) Date: Nov. 6, 1991

[87] PCT Pub. No.: WO91/11737
PCT Pub. Date: Aug. 8, 1991

[30] Foreign Application Priority Data

Jan. 25, 1990 [JP] Japan .................. 2-15509

[51] Int. Cl.$^6$ .................. G08B 21/00; H01H 35/02
[52] U.S. Cl. .................. 340/690; 73/654; 200/614.7
[58] Field of Search ........ 340/690, 689, 669, 521-522, 340/825.63, 825.65; 200/61.47; 73/516 LM, 654.5; 367/178, 188, 906; 33/366

[56] References Cited

U.S. PATENT DOCUMENTS

| | | |
|---|---|---|
| 2,068,315 | 1/1937 | Erich .................. 200/61.47 X |
| 2,161,411 | 6/1939 | Erich .................. 20/61.47 |
| 2,338,811 | 1/1944 | Hasbrook .................. 340/689 X |
| 3,714,456 | 1/1973 | Krohmer et al. .................. 307/117 |
| 3,990,039 | 11/1976 | Miller .................. 357/179 |
| 4,083,255 | 4/1978 | McKechnie .................. 73/655 |
| 4,466,288 | 8/1984 | Grynberg et al. .................. 73/654 |
| 4,662,225 | 5/1987 | Koh et al. .................. 73/655 |
| 4,667,188 | 5/1987 | Schwartz .................. 340/689 |
| 4,689,997 | 9/1987 | Windisch .................. 340/690 X |

FOREIGN PATENT DOCUMENTS

| | | | |
|---|---|---|---|
| 3144471 | 7/1982 | Germany . | |
| 54-139764 | 10/1979 | Japan . | |
| 55-101021 | 8/1980 | Japan . | |
| 55-116224 | 9/1980 | Japan . | |
| 57-22020 | 2/1982 | Japan . | |
| 58-88686 | 5/1983 | Japan . | |
| 58-174882 | 10/1983 | Japan . | |
| 61-39950 | 11/1986 | Japan . | |
| 63-41406 | 8/1988 | Japan . | |
| 129825 | 5/1990 | Japan .................. | 200/61.47 |
| 11512 | 1/1991 | Japan .................. | 200/61.47 |
| 2160319 | 12/1985 | United Kingdom . | |

Primary Examiner—John K. Peng
Assistant Examiner—Thomas J. Mullen, Jr.
Attorney, Agent, or Firm—Cushman, Darby & Cushman

[57] ABSTRACT

A vibration sensor has a bell shaped casing with a recess formed at its closed end. The recess has a flat bottom and slanted side walls so that an opening of the recess is larger than the bottom of the recess. The casing serves as a first electrode. Mercury of drop-shape is disposed in the recess, and at least two second electrodes are disposed circumferentially around the mercury. This structure creates three vibration systems; i.e., the mercury vibrates in three different modes. The first vibration system is based on the surface tension of the mercury. A portion of the mercury protruding from the recess undergoes vibration. The second vibration system is due to gravity acting on the mercury. The mercury rolls out of the recess between the electrodes in response to vibrations. The third vibration system is based on resonance. The mercury resonates between the electrodes.

9 Claims, 9 Drawing Sheets

EARTHQUAKE DETECTING APPARATUS

TECHNICAL FIELD

The present invention relates to an earthquake detecting apparatus having a vibration sensor for sensor earthquake vibrations and a signal processing means for processing a signal from this vibration sensor.

TECHNICAL BACKGROUND

Conventionally, a vibration sensor for sensing earthquake vibration, combines two vibration systems having natural vibration frequencies in two frequency bands. The two system vibration sensor can detect frequencies higher than that of earthquake vibration to distinguish earthquake vibration from shock vibration caused by a collision of an object with equipment incorporating a vibration sensor.

Figure 10:
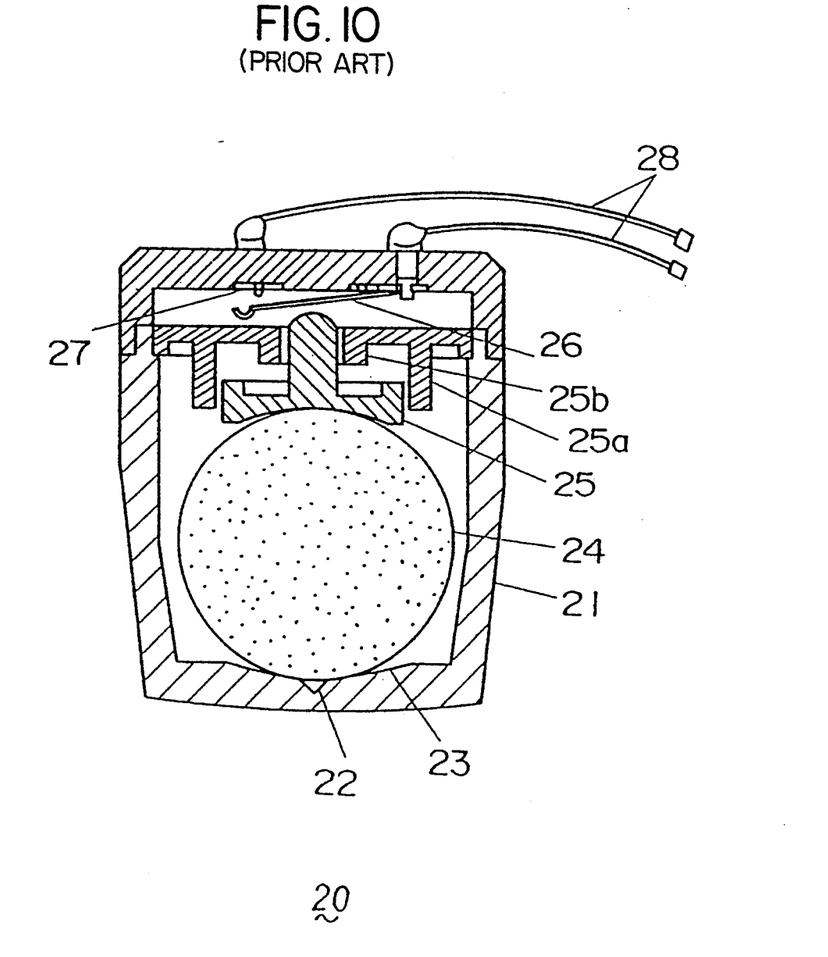
FIG. 10 is a cross-sectional view of a major part of a conventional vibration sensor.

FIG. 10 shows an example thereof. A vibration sensor 20 has a cone-shaped vibrating surface 23. Vibrating surface 23 has a recess 22 whose top end part is small in diameter, and is formed at the central part of the inner bottom surface of a case 21. A comparatively large steel ball 24 (i.e., vibrating member) reciprocates by rolling on this vibrating surface 23. A sliding piece guide 25 moves upwards in response to the rolling of the steel ball 24. Sliding piece guides 25a and 25b support the sliding piece 25 in a vertically slidable manner. A movable contact 26 is pushed up by the sliding piece 25, and a fixed contact 27 contacts the movable contact 26 when it is pushed up.

In the above-mentioned vibration sensor 20, when the steel ball 24, bound in the central recess 22 of the cone-shaped vibrating surface 23, is subject to vibration above a certain value in Gal, it moves out of the recess 22 and reciprocates on the vibrating surface 23. At this time, the movable contact 26 is moved upward by the rolling motion of the steel ball 24, and contacts the fixed contact 27. As a result, an ON/OFF signal is generated from leads 28.

Figure 11:
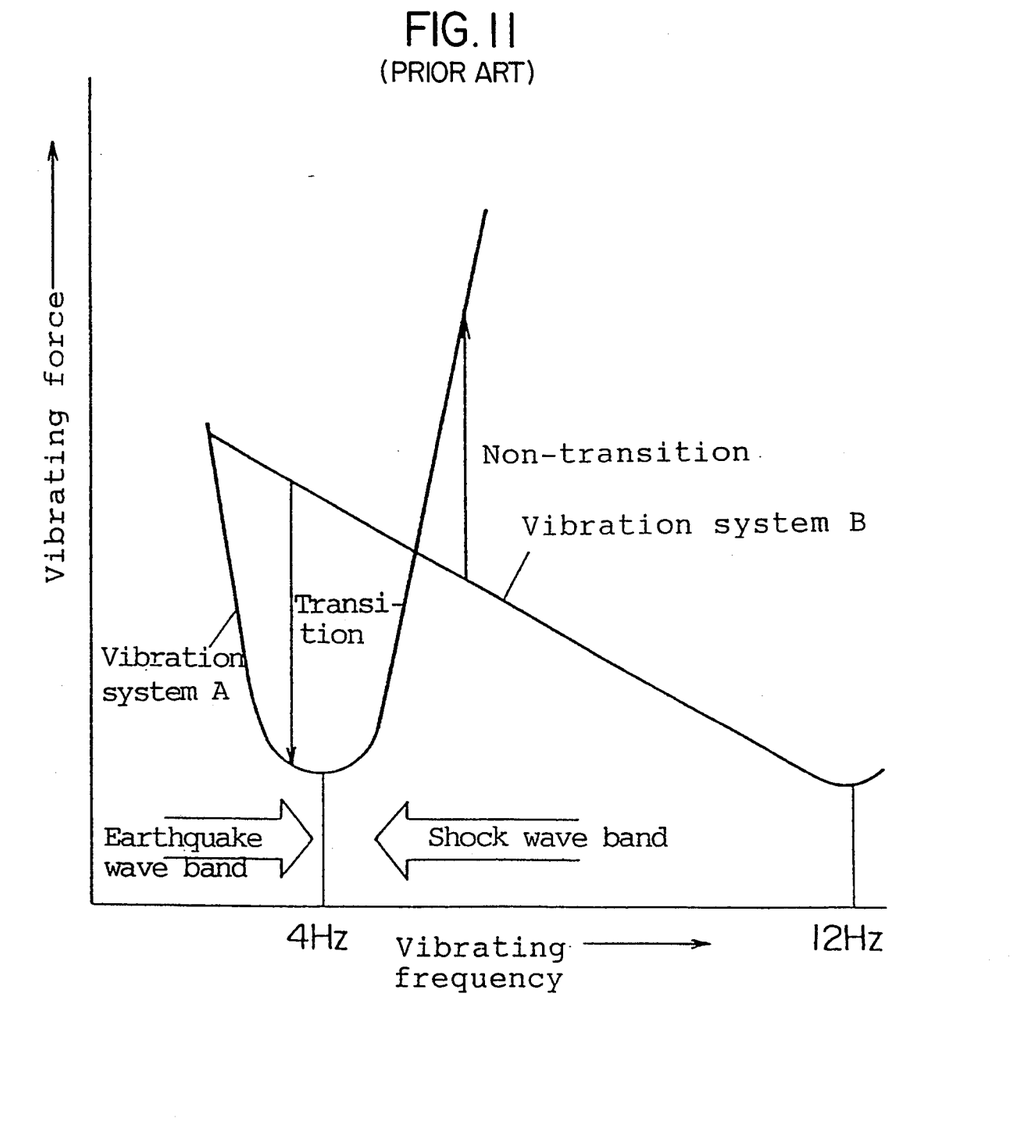
FIG. 11 is an explanatory view of characteristics of the vibration system in FIG. 10.

The vibration system dominating the movement of the steel ball 24 of this conventional vibration sensor 20, as shown in FIG. 11, has a vibration system A and B. The vibration system A has a comparatively low natural frequency (for example, about 4 Hz) which is determined from the curvature of a spherical surface replaced by the vibrating surface 23 and the size of the steel ball 24. The vibration system B has a comparatively high natural frequency (for example, about 12 Hz) which is determined from the diameter of the top end part of the central recess 22 of the vibrating surface 23 and the size of the steel ball 24. Accordingly, when operating in the earthquake wave band (1-4 Hz), the steel ball 24 moves out of the recess 22 at the level of the vibration system B, and thereafter moves to system A operation because of the lower operation level of the vibration system A. The steel ball reciprocates on the vibrating surface 23. Also, when the steel ball 24 operates in the shock wave band (for example, 5 Hz or more) i.e., other than earthquake vibration, it moves out of the recess 22 at the level of the vibration system B and approaches the vibration system A. However, unless a vibrating force above the operation level of the vibration system A is applied, no reciprocating motion on the vibrating surface 23 occurs. This is because the operation level of the vibration system A is higher than the applied vibrating force.

Figure 12:
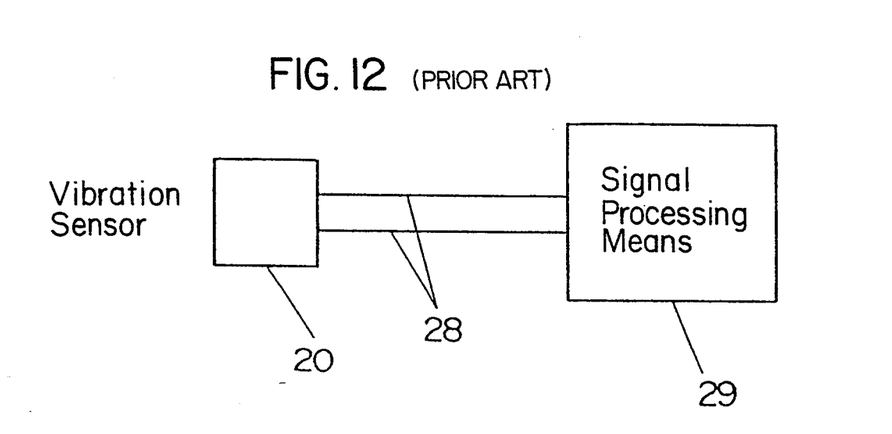
FIG. 12 is a block diagram of the vibration sensor in Fig.10.

However, the actual vibration at a shock or the like sometimes has a frequency close to the earthquake wave band, and even a frequency above 5 Hz sometimes causes a vibrating force exceeding the operation level of the vibration system A. Therefore, as shown in FIG. 12, a signal processing means 29 is connected to the leads 28 of the vibration sensor 20 to process an ON/OFF signal of the vibration sensor. When ON-time pulses above a predetermined time width (for example, 30 ms) are generated a predetermined number of times (for example, five times) within a predetermined time (for example 3 sec) and an OFF-time is above a predetermined time length (for example, 40 ms) the vibration is judged to be an earthquake vibration. The predetermined time width of each ON-time and OFF-time are set to a value which will not produce detection of shock wave or the like having a frequency component higher than an earthquake wave. However, since the lengths of ON-time and OFF-time disperse, each are set to have some margin. For example, in the case where the predetermined time widths of the ON-time and OFF-time are set respectively to 50 ms and 60 ms, the following holds:

$$\frac{1}{(0.05 + 0.06) \times 2} = 4.5 \text{ (Hz)},$$

and therefore, principally any vibration having a frequency above 5 Hz is not detected. But in actuality the lengths of ON-time and OFF-time disperse; and therefore, there is a fear that the main earthquake vibration might not be detected. Accordingly, the above-mentioned predetermined time widths of ON-time and OFF-time are set to 30 ms and 40 ms, respectively, to incorporate some margin of forgiveness. Thus from the following:

$$\frac{1}{(0.03 + 0.04) \times 2} = 7 \text{ (Hz)},$$

any vibration having a frequency above 7 Hz is not detected. Also, the number of ON-pulses during a predetermined time and the predetermined time, during which these pulses are counted, are set to values at which shock waves or the like having a frequency close to the earthquake wave band are not detected.

The above-mentioned conventional vibration sensor as has an unstable vibration because two vibration systems exist on the same vibrating surface. When the steel ball 24 is vibrating in the vibration system A, it passes through the central recess 22 of the vibrating surface 23. At this time it returns once to vibration system B operation, and this causes an interference between the two vibration systems. When the steel ball 24 is vibrating in the vibration system A, the small diameter of the top end part of the recess 22 causes the center of gravity of the steel ball 24 to act out of the range of the recess 22. Therefore when the steel ball passes through the recess 25 the direction of motion of the steel ball 24 is changed or a rotary motion is induced.

An earthquake detecting system also must discriminate between an earthquake wave and the vibration caused by a collision of an object with the equipment incorporating the vibration sensor. This characteristic is in addition to the function of reliably detecting the earthquake wave. Where the equipment incorporating the vibration sensor is firmly fixed, the vibration caused by a shock is small. The frequency of this vibration is high in comparison with an earthquake wave, and discrimination therebetween is easily made. On the other hand, when the equipment incorporating the vibration system is loosely fixed by piping or the like, the inadvertent vibration is large. The frequency of this vibration becomes close to that of the earthquake wave, and therefore discrimination therebetween becomes difficult. To detect the earthquake wave reliably and discriminate the earthquake wave from the shock wave, it is required that the frequency characteristic of the vibration sensor be flat in the earthquake wave band (1.4–3.3 Hz) and rise sharply before the shock wave band (for example, 5 Hz or more). It is difficult to realize such a characteristic using a single vibration system. The vibration system of the conventional vibration sensor, as described, attempts to accomplish discrimination by combining two vibration systems. Now, description is made of the characteristics of the vibration system of this conventional vibration sensor using FIG. 11. The natural frequency of the vibration system A is, for example, about 4 Hz, and the natural frequency of the vibration system B is, for example, about 12 Hz. When operating in the earthquake wave band, the vibration member 24 moves out of the recess 22 at the operating level of the vibration system B, having a gentle slope in this band, and thereafter it moves to the operating level of vibration system A because of the lower operating level of the vibration system A. The steel ball 24 reciprocates while turning on the contact 26. When the vibrating frequency of the steel ball 24 becomes high and the operating level of the vibration system A becomes higher than that of the system B, the steel ball 24 does not move from the vibration system B to the vibration system A by the same vibrating force. When the steel ball 24 does not vibrate in the vibration system A, the contact 26 is not turned on, and therefore the operating point moves to the vibration system A and rises sharply.

This linked vibration system has two vibration systems on the same vibrating surface, and therefore has an unstable vibration. The vibration member 24 has a degree of freedom of 360° with respect to the vibrating direction, and therefore a slight disturbance to the vibrating direction is likely to make the vibration unstable. As shown in the conventional example, the recess 22 in the center of the vibrating surface 23, causes vibration member 24 to either change direction or begin a rotary motion as vibration member 24 pass over recess 22.

As a means for discriminating an earthquake wave from shock wave on the signal processing means 29 side, a method is adopted which sets a lower limit value of pulse width of the ON/OFF signal from the vibration sensor 20. An earthquake wave is not detected when pulses are below this lower limit value. Actually, however, the pulse width of the ON/OFF signal from the vibration sensor disperses, and the above-mentioned lower limit value is required to be set with a considerable margin. Therefore this method has no practical discriminating effect on shock waves close to the earthquake wave band.

Figure 13:
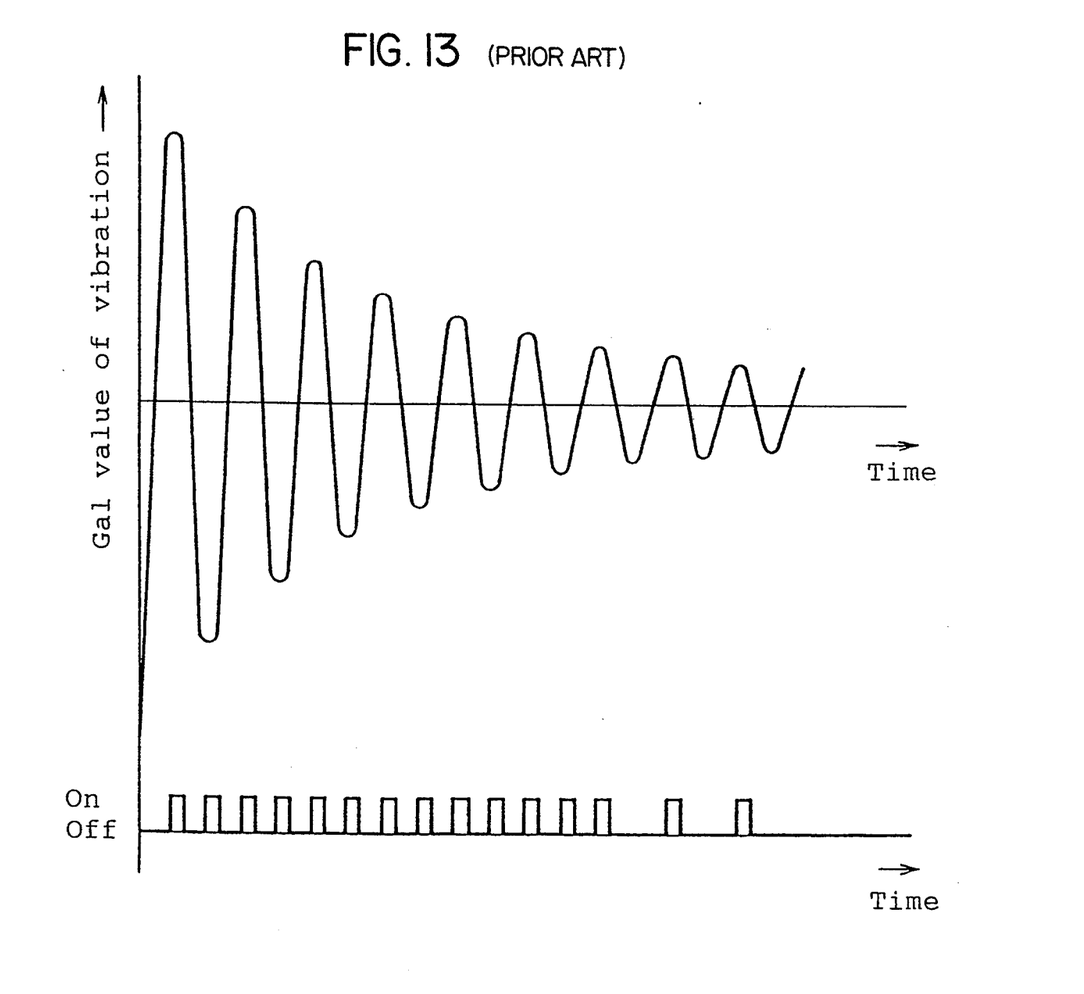
FIG. 13 is an explanatory view of the shock wave characteristics of the vibration sensor in FIG. 10.

In the actual shock test shown in FIG. 13, there is worse shock resistance before or after the disappearance of signal pulses occurring after gradual attenuation of the shock wave. This is caused where the movement of the vibration member 24 becomes weak and unstable, signal pulses are missed, the frequency is lowered equivalently, and the pulses are not filtered by the above-mentioned frequency filter.

SUMMARY OF THE INVENTION

A first object of the present invention is to obtain a vibration sensor which reliably detects an earthquake wave, discriminates between an earthquake wave and a non-earthquake wave, and operates stably using a plurality of vibration systems.

A second object of the present invention is to generate characteristic signal pulses in the shock wave band, and specifically to obtain a vibration sensor wherein the OFF width of signal pulses is considerably short compared to the earthquake wave band, signifying high frequency. Thus, discrimination of a shock wave or the like from an earthquake wave is made easy, and the drop-out of signal pulses during attenuation is suppressed.

A third object of the present invention is to provide a signal processing means for processing signal pulses from such a vibration sensor to perform optimum detection.

To attain the above-mentioned first object, the sensor in the present invention is formed with a spring vibration system wherein drop-shaped mercury is supported at its bottom and the surface tension of mercury acts as a spring.

Further, in order to attain the second object of the present invention, a vibration system is formed wherein drop-shaped mercury and electrodes surrounding this mercury contact in the frequency band of a shock wave causing resonance of the mercury between the electrodes.

Further, in order to attain the third object of the present invention, the ON width and the OFF width of signal pulses recognized as adaptable pulses and the number of pulses for judging an earthquake wave are optimized.

Further, to attain the second object, the apparatus of the present invention, comprises: a vibration sensor wherein mercury is placed in a recess at the center of a vibrating surface having a gentle descending slope toward the center, and electrodes which do not contact the above-mentioned mercury normally and contact only during vibration are installed around the above-mentioned mercury; a signal processing means which processes an ON/OFF signal of the above-mentioned vibration sensor, and judges that this is an earthquake; and wherein the amount of the above-mentioned mercury is set to 0.4–0.5 gr, the depth of the above-mentioned recess is set to 0.45–0.55 mm, the bottom face of the above-mentioned recess is made smaller than the opening thereof and the side wall surface tapers from the opening to the bottom, the inner diameter of the bottom face of the above-mentioned recess is set to 2.5–3.0 mm, and the distance between the above-mentioned mercury and the above-mentioned electrode is set to 0.5–1.5 mm.

In the vibration sensor forming the earthquake detecting apparatus of the present invention, the vibration system has a first vibration system by means of a spring action of the surface tension of a drop-shaped mercury which is supported at the bottom thereof, and a second vibration system by means of mercury rolling motion. The former of these two vibration systems is a sort of spring system caused by the surface tension of the mercury, and the latter thereof operates by gravity. The operating principles of the two systems, differ from each other, so that they do not interfere with each other even though they operate on the same vibrating surface.

Also, the spring system formed by means of the mercury's surface tension is stable because it depends only on the physical values of mercury. Also in the vibration system formed by means of rolling motion, the range of movement of the center of gravity of the mercury ball is mainly within the range of the central recess of the vibrating surface, and the rolling motion itself is performed within a comparatively stable range.

Another vibration system is formed by the drop-shaped mercury contacting the electrodes and resonating therebetween. The mercury is deformed into an elliptic shape by the shock or collision with the electrode. Thereafter the mercury moves along the electrodes, its shape alternating elliptical forms by exchanging the major axis and the minor axis of the ellipse. Therefore the distance between the electrode and the mercury ball is shortened and the OFF time of signal pulses is considerably shortened. Also, this resonance phenomenon is caused by the mercury ball receiving energy from the electrode. Therefore the vibration attenuates quickly when the vibrating force attenuates because the mercury ball separates from the electrode only once.

Furthermore, the ON width and the OFF width of signal pulses recognized to be adaptable pulses and the number of pulses for judging to be earthquake are optimized, and therefore the signal pulses of the vibration sensor having these three kinds of vibration systems can be judged as to indicate an earthquake wave or shock wave.

DETAILED DESCRIPTION OF THE PREFERRED EMBODIMENTS

Figure 1:
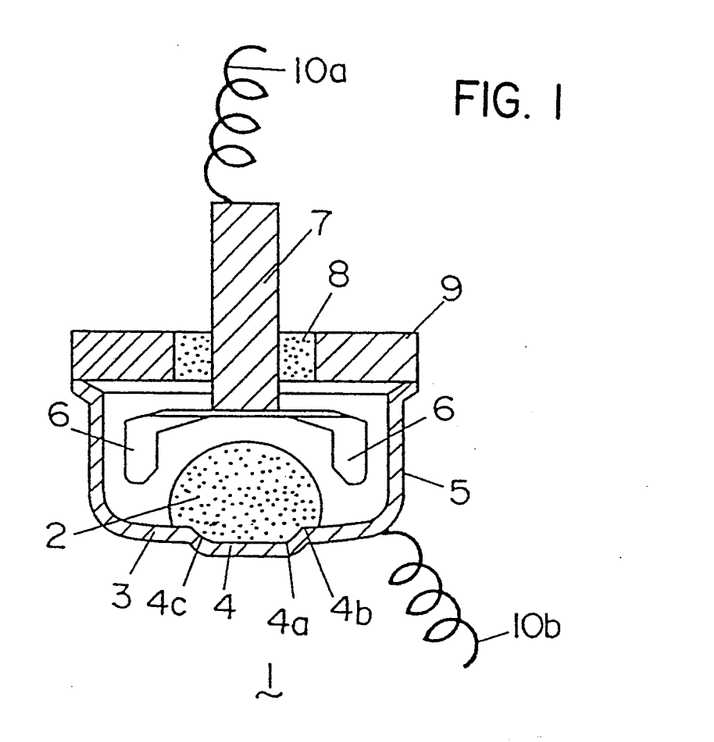
FIG. 1 is a cross-sectional view of a major part of an earthquake detecting apparatus in an embodiment of the present invention.

Hereinafter, description is made of an embodiment of the present invention based on the appended drawings. In FIG. 1, a vibration sensor 1 has a pot 5 holding mercury 2, a cover 9 thereof, and electrodes 6 located in the pot 5. The drop-shaped mercury 2 is placed as the vibration member in a central recess 4 of a vibrating surface 3 of the pot 5. The central recess 4 has a gentle descending slope toward the center. Recess 4 has a taper-shaped wall surface 4c so that its bottom 4a is smaller than an opening 4b thereof. Recess 4 supports the mercury 2 from the side, thereby stably holding the mercury 2.

Figure 2:
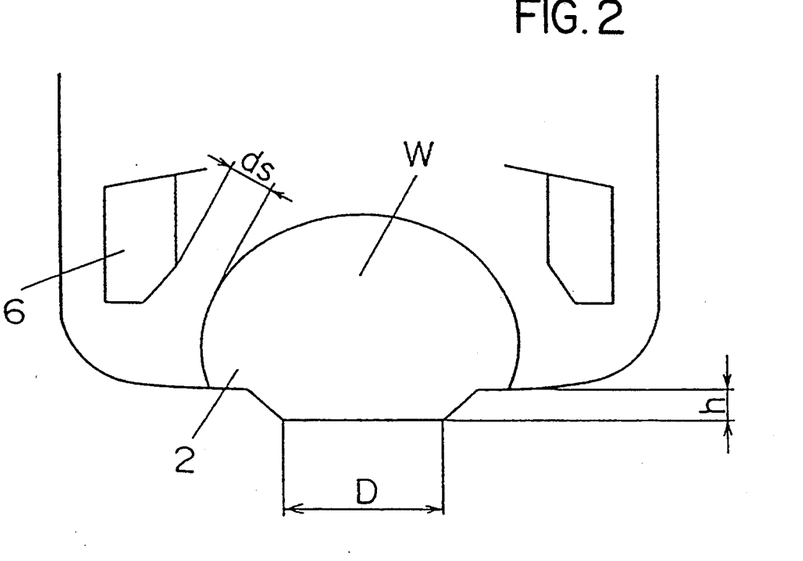
FIG. 2 is an explanatory view of the vibration for explaining the operation of a vibration system according to FIG. 1.

A weight W of the mercury 2, a depth h of the recess 4 and a diameter D of the bottom 4a as shown in FIG. 2 are determined respectively as follows so that a part of the mercury 2 protrudes from the opening 4b when the mercury 2 is placed in the recess 4:

$w = 0.4 - 0.5$ g $h = 0.45 - 0.55$ mm $D = 2.5 - 3.0$ mm.

Figure 3:
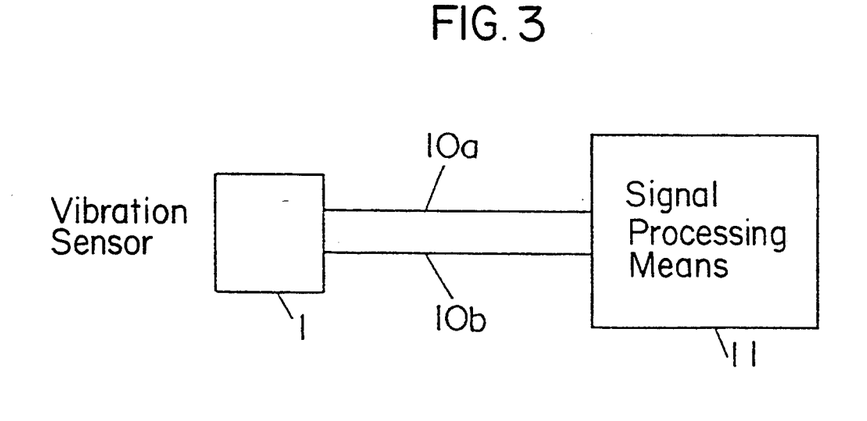
FIG. 3 is a configuration view of the earthquake detection apparatus in FIG. 1.

The peripheral part of the vibrating surface 3 further rises in a cylindrical shape, to form the pot 5. The electrodes 6 are installed circumferentially about mercury 2 at a distance ds therefrom see FIG. 5. The electrode 6 are supported by a conductive stay 7, and this stay 7 is further fixed to the cover 9 through an insulator glass seal 8. Further, this cover 9 is fixed to the pot 5. The pot 5 is made from a conductive material (for example, iron) which does not easily produce an amalgam with mercury. The pots form a pair of electrodes together with the above-mentioned electrodes 6. A signal from the vibration sensor 1 is output by connecting leads 10a and 10b from the stay 7 and the pot 5, respectively. The leads 10a and 10b are connected to a signal processing means 11 as shown in FIG. 3. A distance ds between the mercury 2 and the electrode 6 shown in FIG. 2 is determined as follows so that a third vibration system formed by a collision of the mercury 2 with the electrode 6 as described later is generated in the region of shock wave band close to earthquake wave band:

$ds = 0.5 - 1.5$ mm.

In this embodiment, the weight of the mercury 2 is set to 0.4–0.5 g which is a little larger than the weight (about 0.3 g) which makes the mercury 2 spherical, and the size of the recess 4 is set so that the mercury 2 protrudes partly from the opening 4b when placed as mentioned above. The bottom 4a of the recess 4 is made smaller than the opening 4b because the wall surface 4c thereof is tapered or slants. Thus, the mercury 2 is held stably.

This means that the mercury 2 is deformed at the boundary linking the opening 4b and the vibrating surface 3, but the surface tension of the mercury 2 acts in such a manner that this deformation becomes uniform along the whole periphery of the mercury 2. Therefore the mercury 2 is located in the center of the recess 4, and the boundary condition of a vibration system is determined by the surface tension of the mercury 4. Thus a first vibration system is formed.

The first vibration system dominating the movement of the mercury 2 of this embodiment is sort of a spring system based on the surface tension of the mercury 2 which vibrates only at its top part while its the bottom thereof remains intact in the recess 4.

Further, the mercury 2 forms a second vibration system by the rolling motion of the mercury 2 due to a vibrational force which causes the mercury 2 to roll out of the recess 4.

The first vibration system operates based on surface tension, while the second vibration system is based on gravity. The operational principles differ from each other, and therefore both vibration systems do not interfere with each other even if they operate on the same vibrating surface. Also, the vibration of the spring system by means of surface tension depends mainly on the physical values of mercury, and therefore is stable. Further, as to the vibration by means of rolling motion, the inner diameter of the bottom of the recess 4 is set at 2.5–3.0 mm, and the distance between the mercury 2 and the electrode 6 installed therearound is set at 0.5–1.5 mm which is smaller than the inner diameter. Therefore the range of movement of the center of gravity of the mercury ball is mainly within the range of the central recess of the vibrating surface, and performs a comparatively stable rolling motion.

In the second vibration system, the mercury 2 is rolled by the vibrating force and almost rolls out of the recess 4. The natural frequency of this vibration system is also determined from the shape of this recess 4 and the weight W of the mercury 2. The natural frequency of the mercury 2 rolling out of the recess 4 is desirably set at 10 Hz or more to secure the uniform sensitivity in the earthquake wave band.

Figure 5:
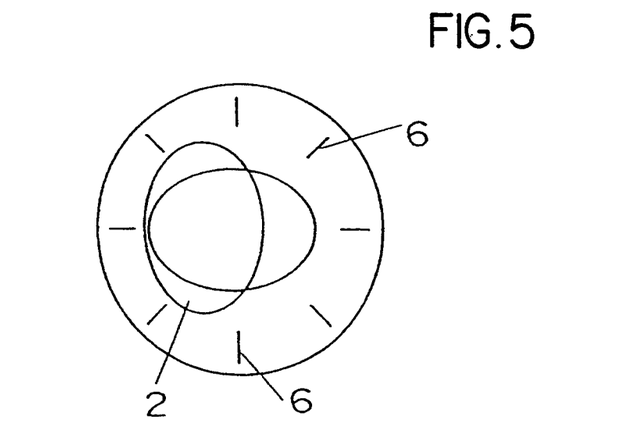
FIG. 5 is an explanatory view of a state of deformation of mercury in the vibration system of FIG. 1.

Since the weight of the mercury 2, the distance between the mercury 2 and the electrode 6 and the like are made as mentioned above, in the shock wave band, particularly in the case of a shock wave having a frequency close to that of the earthquake wave band, a resonance phenomenon is caused wherein the mercury 2 strongly touches the electrode 6 and is repelled by the electrode 6. This forms the third vibration system by means of resonance of the mercury and the electrode. At this time, the mercury 2 is deformed into an elliptic shape (when viewed from above) by a shock or collision with the electrode 6. Thereafter the mercury 2 moves between the electrodes, its shape altering elliptical forms by exchanging the major axis and the minor axis as shown in FIG. 5.

As described above, in this embodiment, when a horizontal vibrating force is applied to the vibration sensor 1, the mercury 2 which is a vibration member of the vibration sensor 1 can vibrate in three kinds of vibration systems. The first vibration system is a vibration system where the surface tension of the mercury 2 acts as a spring, and the resonance point is set to about 8 Hz–10 Hz. Therefore, the vibration member resists rolling in the earthquake wave band, but will begin a rolling motion with less resistance when the vibrating frequency becomes high. The second vibration system, called a pendulum vibration system is formed by a rolling motion of the mercury in the recess 4. The sensitivity of the second vibration system in the earthquake wave band is uniform due to the high frequency of the resonance point. Thus the mercury 2 is held to a certain vibrating force.

Figure 4:
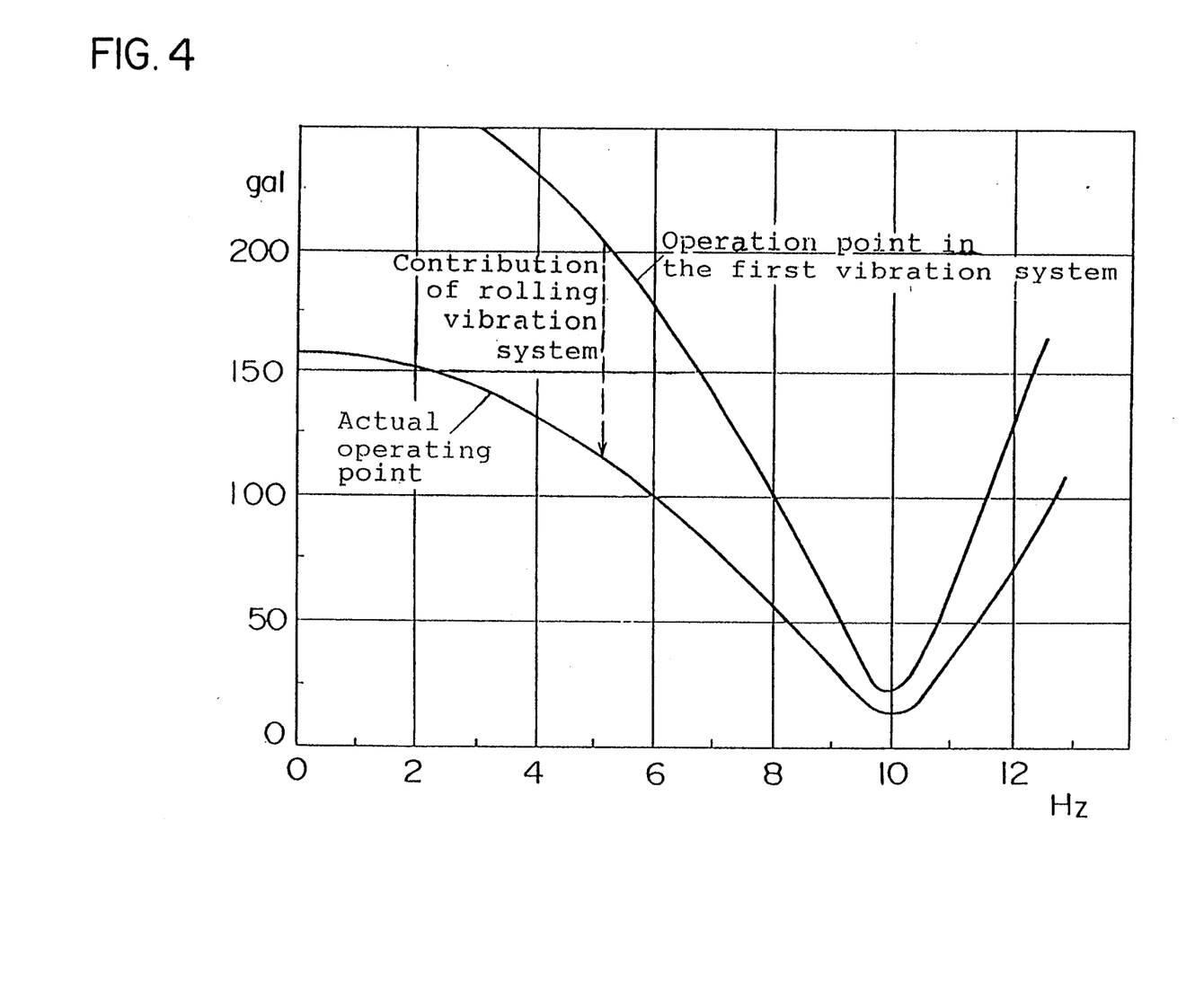
FIG. 4 is an explanatory view of the characteristics of the vibration system of FIG. 1.

In the earthquake wave band, the first vibration system and the second vibration system operate in a linked manner. This means that the mercury 2 makes a rolling motion while swung by the surface tension, and makes a reciprocating motion between plural electrodes 6. FIG. 4 shows operating characteristics of the vibration sensor 1 aiming at the first and the second vibration systems when the resonance point of the first vibration system is set to 10 Hz. The first vibration system whose resonance point is 10 Hz greatly raises the actual operating point which is set by adding the second vibration system by means of rolling motion thereto. In the example in FIG. 4, the interval between the mercury 2 and the electrode 6 is only 0.7 mm, and the effect of the distance between the electrode 6 and the mercury 2 on the actual operating point is large. This distance effect becomes larger when the vibration system has a more linear characteristic against the vibrating force. The vibration sensor 1 does not operate by the first vibration system having a linear characteristic. Only after adding of the second vibration system based on the mercury 2 rolling out of the recess due to a certain vibrating force or larger allows the vibrational sensor to work. Furthermore, the dispersion of the operating point due to the distance ds between the mercury 2 and the electrode 6 is reduced to a large extent, because of the second vibration system. The second vibration system has a strong influence on the operating point of the vibrational sensor in the earthquake wave band.

The third vibration system is the vibration of drop-shaped mercury 2 when the mercury 2 strongly collides with the electrode 6. In the third vibration system, the mercury 2 receives vibration energy directly from the electrode 6. Due to the vibrational parameters of the weight and surface tension of the mercury, the distance ds between the mercury 2, the electrode 6, the shape of the mercury 6 and the like the vibration becomes intensive at resonance. FIG. 5 shows a pattern of this vibration. When colliding with the electrode 6, the mercury 2 compresses in the direction of the electrode 6, and thereafter repels owing to the surface tension, stretching into an ellipsoidal shape. It is considered that this vibration mode basically corresponds to the secondary mode of vibration caused by the surface tension of a liquid drop. When this vibration mode is generated, the distance between the electrode 6 and the mercury 2 is reduced. Accordingly, the width of the OFF time portion of the ON/OFF signal of the vibration sensor 1 is reduced to a large extent. The signal processing means 11 judges the frequency of vibration to be high when the vibrational sensor is in this third vibrational system. Therefore even in the case of a shock wave of a frequency near the earthquake wave band, this is not misjudged to be earthquake.

Figure 6:
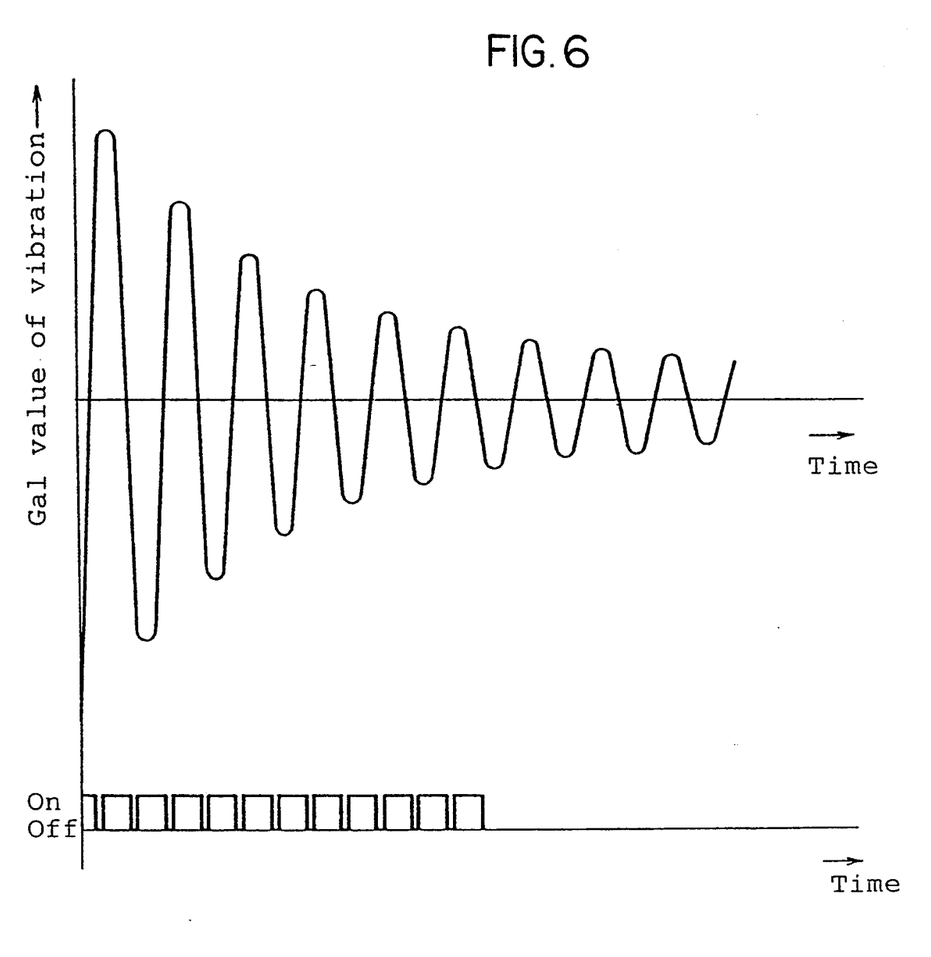
FIG. 6 is an explanatory view of shock wave characteristics of a vibration sensor as in FIG. 1.

Also, this resonance phenomenon is caused by the mercury ball receiving energy from the electrode, and therefore, when the vibrating force attenuates, the mercury 2 departs from the electrode 6 once, and the vibration attenuates quickly as shown in FIG. 6. Consequently, the drop-out of ON-pulses when the ON-pulse signal of the vibration sensor 1 begins to disappear is not misjudged by processing means 11 as that of an earthquake wave or an equivalently low frequency.

Figure 8:
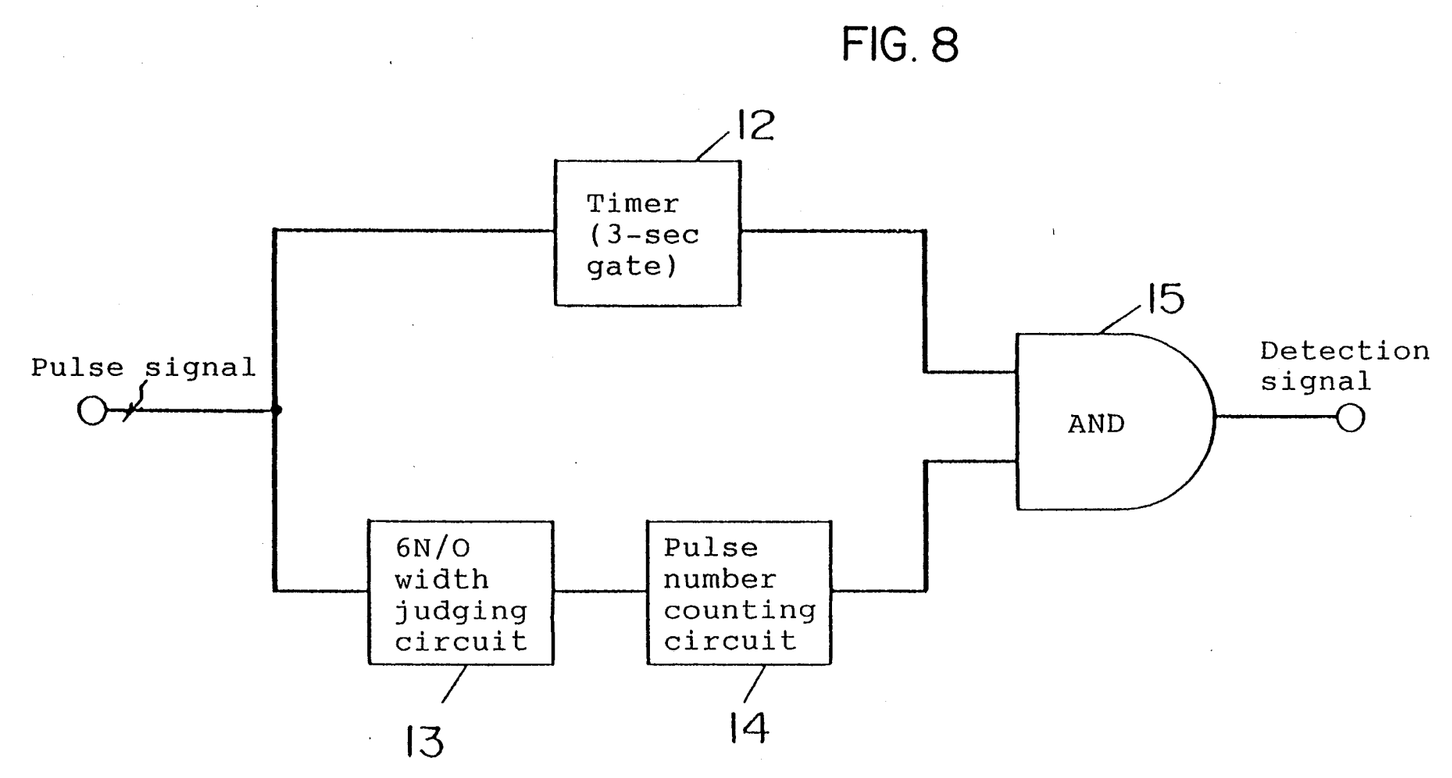
FIG. 8. is a specific block diagram in the configuration view of FIG. 3.
Figure 9:
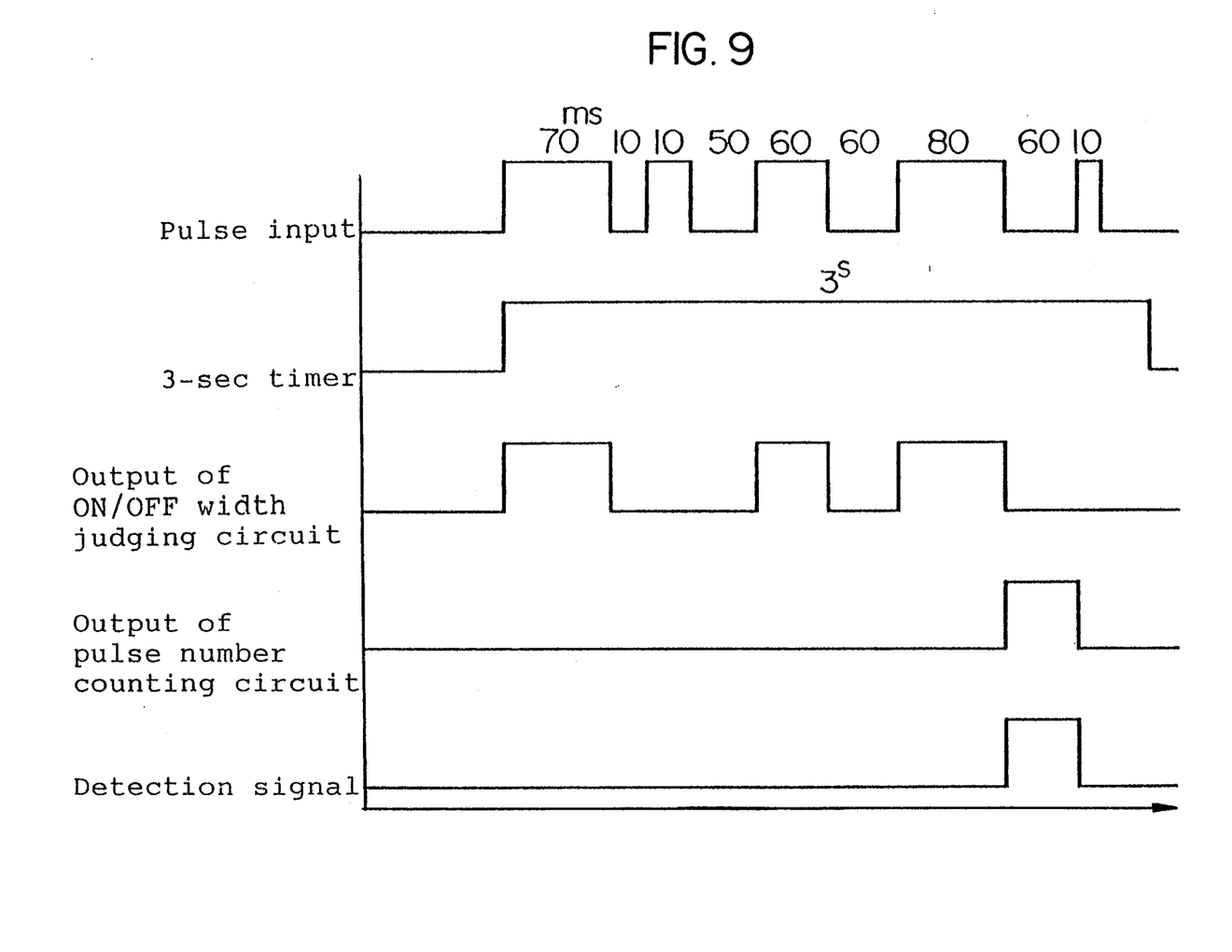
FIG. 9 is a timing chart in the block diagram of FIG. 8.

Further, signal pulses from the vibration sensor 1 are input to the signal processing means 11 consisting of a microcomputer. This signal processing means 11, as shown in FIG. 8, has a timer 12 for issuing a signal of three seconds, a judging circuit 13 comprising a filter for judging the ON and OFF widths of the signal pulses, a pulse number counting circuit 14, and an AND circuit 15. When signal pulses are input from the vibration sensor 1, the judging circuit 13 judges whether or not the ON width of the pulses is longer than a lower limit value $T_n$ and the OFF width thereof is longer than a lower limit value $T_f$. When the pulses satisfy these conditions, the pulse number counting circuit 14 detects this as one pulse; and when this takes place a predetermined number of times within a predetermined time set by the three-second timer 12, judgment is made that an earthquake wave is detected. Then in this embodiment, in order not to detect a shock wave, an earthquake wave is determined when the ON/OFF signal of the vibration sensor 1 contains ON-time pulses of 40 ms or more, at a rate of three times or more within three seconds, with an OFF-time of 40 ms.

Figure 7:
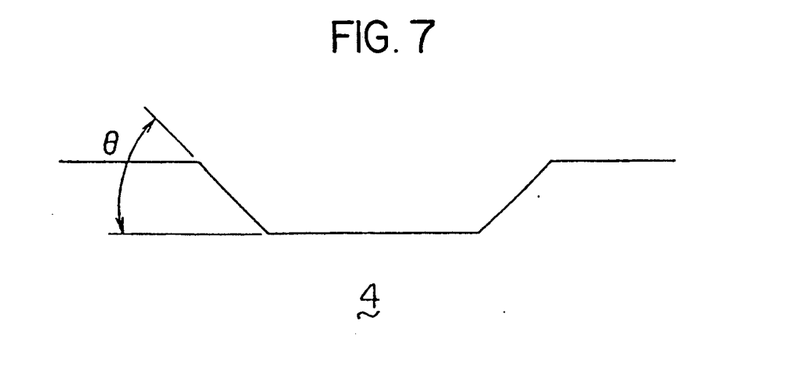
FIG. 7 is a magnified explanatory view of a recess of a vibration sensor showing another embodiment of the present invention.

Furthermore, as to the recess 4, the shape of the wall surface 4c supporting the mercury 2 from the side in the recess 4 is particularly important. As shown in FIG. 7, the slant angle $\theta$ of the wall surface 4c is set to $\theta = 40°$ to 50°, which is close to the wet angle of mercury. By making the recess 4 as described above, the front face of the wall surface 4c uniformly contacts the mercury 2 and the vibration system is stabilized. Thus the vibration sensor apparatus can function more reliably.

Applicability in Industries

As described above, according to the present invention, the vibration system of the vibration sensor is formed with a basic vibration system by means of the surface tension of the drop-shaped mercury which is supported at its bottom, and the rolling motion of the mercury. The former of these two vibration systems is a sort of spring system, and the latter operates by gravity. Therefore, a stable vibration sensor is obtained even if the two systems operate on the same vibrating surface because the operating principles of the two systems differ from each other.

Also, the apparatus is formed so that the drop-shaped mercury resonates between electrodes generating signal pulses with a considerably short OFF-time. This resonance phenomenon is caused by the mercury ball receiving energy from the electrode. Therefore when the vibrating force attenuates, the vibration attenuates quickly, and the pattern of the characteristic signal in the shock wave band is not broken.

Furthermore, the lower limit value of the OFF width of the signal pulses is set at what is recognized as pulses which are adaptable in the signal processing means, and therefore the characteristic signal in the shock wave band can be easily discriminated from the width of OFF-signals in the earthquake band.

What is claimed is:

1. A vibration sensor comprising:
   a bell shaped casing having a closed end and a recess formed at said closed end, the recess having a flat bottom and slanted side walls so that an opening at the top of said recess is larger than said bottom of said recess, said casing serving as a first electrode;
   a predetermined quantity of mercury disposed in said recess so as to assume a drop-shape; and
   at least two second electrodes disposed circumferentially around said recess.

2. A vibration sensor as in claim 1, wherein a portion of said mercury protrudes from said recess.

3. A vibration sensor as in claim 1, wherein the angle of said slanted side walls of said recess is set substantially equal to the wet angle of said mercury.

4. A vibration sensor as in claim 1, wherein said mercury is 0.4–0.5 g in weight, said recess has a depth of 0.45–0.55 mm, said bottom of said recess has an inner diameter of 2.5–3.0 mm, said slanted walls of said recess are at an angle of 40–50 degrees and said second electrodes are normally spaced 0.5–1.5 mm from said mercury when said mercury is at rest.

5. An earthquake detecting apparatus comprising:
   a vibration sensor for sensing vibrations, said vibration sensor including,
      a bell shaped casing having a closed end and a recess formed at said closed end, the recess having a flat bottom and slanted side walls so that an opening at the top of said recess is larger than said bottom of said recess, said casing serving as a first electrode,
      a predetermined quantity of mercury disposed in said recess so as to assume a drop-shape, and
      at least two second electrodes disposed circumferentially around said recess; and
   signal processing means, connected to said first electrode and said second electrodes, for producing an ON/OFF signal responsive to simultaneous contact of said mercury with said first electrode and one of said second electrodes due to vibrations applied to said casing, and for determining whether said vibrations are caused by an earthquake based on said ON/OFF signal.

6. An earthquake detecting apparatus as in claim 5, wherein an ON-time of said ON/OFF signal occurs for a length of time that said mercury is in contact with said first electrode and one of said second electrodes; an OFF-time of said ON/OFF signal occurs for a length of time that said mercury is not in contact with said first electrode and any of said second electrodes; and said signal processing means determines that said vibrations are caused by an earthquake when three or more ON-times each greater than or equal to 40 ms occur during said ON/OFF signal within three seconds, and all OFF-times of said ON/OFF signal are greater than or equal to 40 ms.

7. A vibration sensor for sensing vibrations, said vibration sensor comprising:
   a pot having a predetermined quantity of mercury disposed in a recess formed on a bottom of said pot so that the entire quantity of said predetermined quantity of mercury assumes a drop shape with space surrounding said mercury and electrodes disposed circumferentially around said recess in said surrounding space;
   a first vibration system based on surface tension of said mercury, wherein a portion of said mercury protruding from said recess undergoes vibration due to said surface tension of said mercury and vibrations received by said pot, such that said portion of said mercury contacts said electrodes when undergoing vibration; and
   a second vibration system based on a rolling motion of said mercury, wherein said mercury rolls out from said recess between said electrodes in response to vibrations received by said pot and contacts said electrodes.

8. A vibration sensor as in claim 7, wherein the electrodes surrounding said mercury extend below an upper most portion of said mercury.

9. A vibration sensor for sensing vibrations, said vibrations, said vibration sensor comprising:
   a pot having a predetermined quantity of mercury disposed in a recess formed on a bottom of sad pot so that the entire quantity of said predetermined quantity of mercury assumes a drop shape with space surrounding said mercury and electrodes disposed circumferentially around said recess in said surrounding space;
   a first vibration system based on surface tension of said mercury, wherein a portion of said mercury protruding from said recess undergoes vibration due to said surface tension of said mercury and vibrations revved by said pot, such that said portion of said mercury contacts said electrodes when undergoing vibration;

a second vibration system based on a rolling motion of said mercury, wherein said mercury rolls out from said recess between said electrodes in response to vibrations received by said pot and contacts said electrodes; and a third vibration system responsive to resonance of said mercury between said electrodes, wherein said mercury impacts said electrodes and receives energy therefrom to enter a resonance state in response to vibrations received by said vibration sensor.

* * * * *

UNITED STATES PATENT AND TRADEMARK OFFICE
CERTIFICATE OF CORRECTION

PATENT NO.    : 5,396,223
DATED         : March 7, 1995
INVENTOR(S)   : IWABUCHI, ET AL.

It is certified that error appears in the above-identified patent and that said Letters Patent is hereby corrected as shown below:

On the Title page, item [54] Inventors:

Please change "Oohashi Tokuyoshi" to --Tokuyoshi Oohashi--.

Signed and Sealed this

Twenty-fifth Day of July, 1995

*Attest:*

BRUCE LEHMAN

*Attesting Officer*     *Commissioner of Patents and Trademarks*